United States Patent Office 3,331,072
Patented July 11, 1967

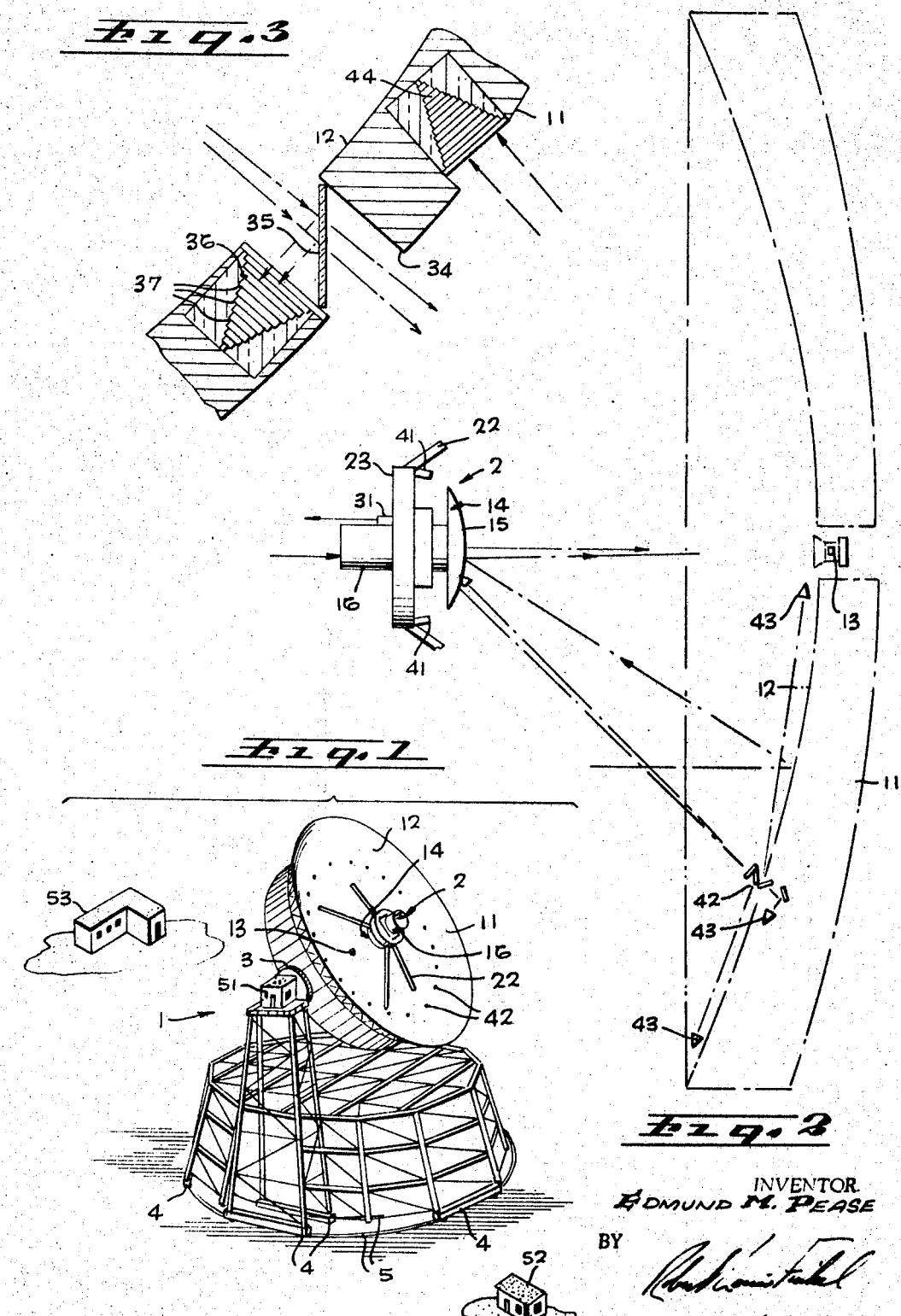

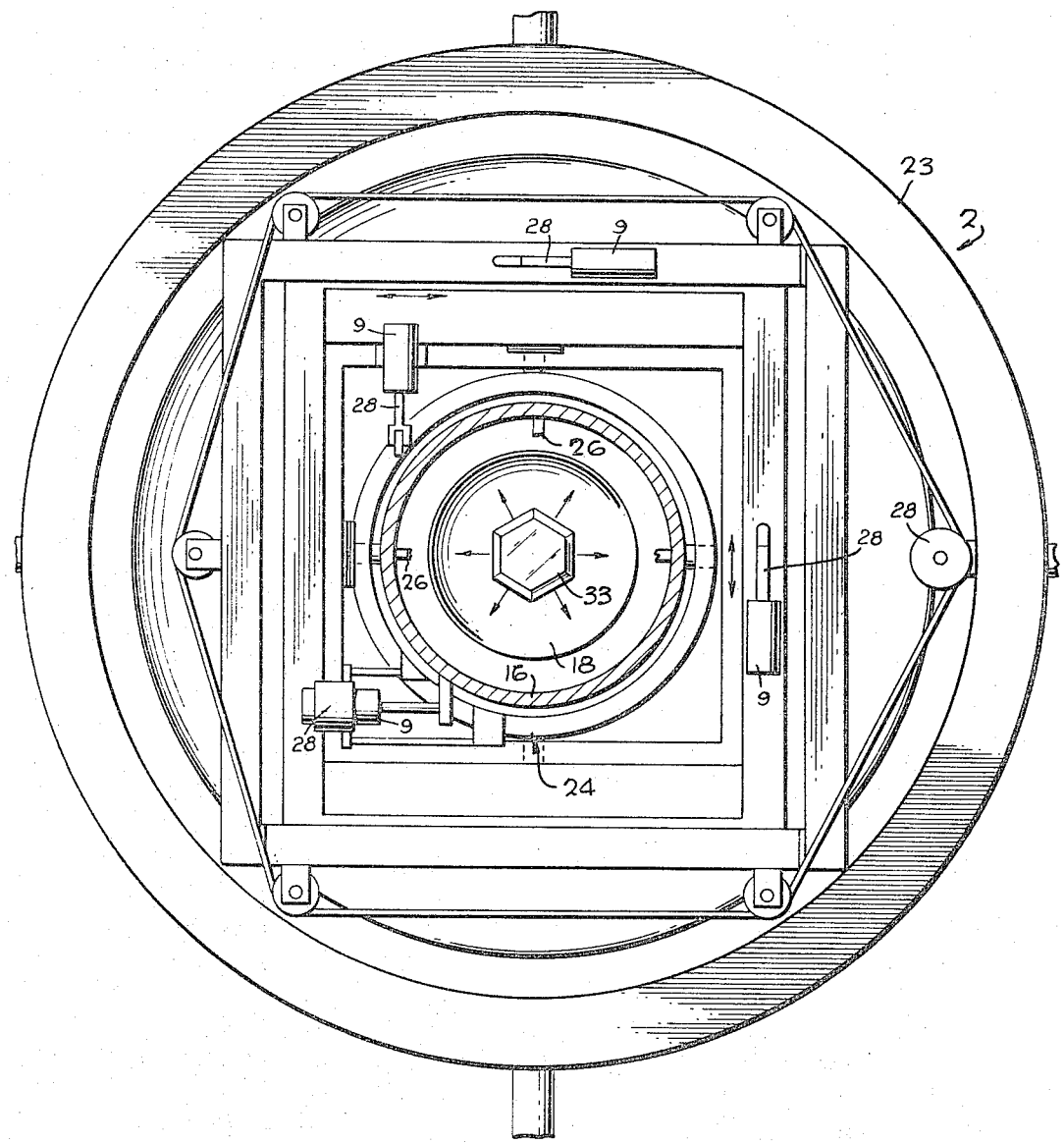

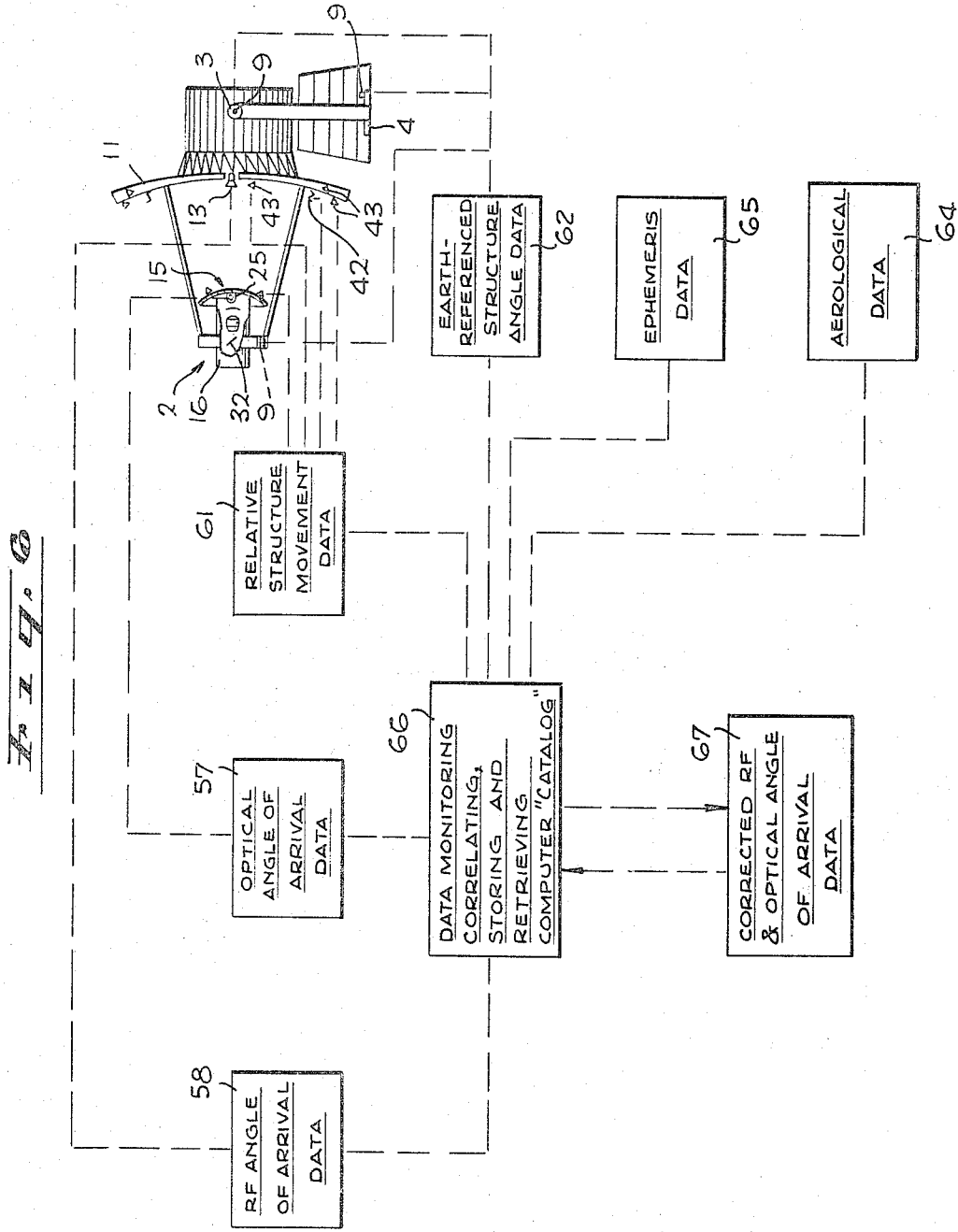

3,331,072
SYSTEM AND METHOD FOR SURVEILLANCE, TRACKING AND COMMUNICATING
Edmund M. Pease, 137 S. Orange St., Glendale, Calif. 91204
Filed July 21, 1965, Ser. No. 473,574
14 Claims. (Cl. 343—117)

ABSTRACT OF THE DISCLOSURE

This disclosure contemplates a high precision system for surveillance, tracking and communicating combining a first electromagnetic sensing system, such as a radiotelescope, having a primary reflecting surface and a secondary energy focusing element, a second electromagnetic sensing system, such as an optical telescope. Mounted on the secondary energy focusing element of the first system, means for detecting and quantizing the relative movements of the second system with respect to the primary reflective surface of the first system, and means for continuously correlating the simultaneous angle of arrival output data from both systems and the quantized relative movements of both systems.

---

This invention relates to high precision systems and methods for surveillance, tracking and communication, and more particularly to improvements in such systems and methods employing apparatus for transmitting and receiving electromagnetic energy in two or more frequency ranges.

As will be readily understood upon reading the specification and claims, the subject invention has many and varied applications. It is perhaps of greatest immediate significance, however, in the field of detecting, tracking and communicating with, objects such as man-launched space vehicles and missiles in near or deep space. Accordingly, for the purpose of this discussion, attention will be directed principally to several preferred embodiments of the invention which are adapted to these uses.

In order to appreciate more fully the nature and the advantages of the present invention it would be well to consider briefly the historical background out of which it was conceived.

A. The system

Systems utilizing radiant energy transmitting or receiving means for determining the positions of bodies in space may be classified in three broad categories: One of these comprises generally optical telescopes and cameras employing electromagnetic energies in the visible, ultraviolet, or infrared ranges; the second includes radars or radiotelescopes employing radiation in the very high, ultra high and extremely high radio frequencies; and the third embraces a growing family of devices which incorporate two or more of these two systems.

Regardless of the category into which they fall, all such systems are essentially means for measuring the angle of arrival of energy with reference to some predetermined set of axes or coordinates. Likewise, systems for communicating with objects travelling at great speeds in space depend upon the accurate determination of the objects' positions, and therefore at least indirectly, upon the measurement of this angle of arrival.

Certain fundamental problems have long attended the use of all such systems. Angle of arrival measurements are always affected by the refraction of radiant energy by the Earth's atmosphere, and may be influenced by extra-atmospheric forces. Presently these factors are either ignored or approximated, through involved and time consuming analyses of measurements of atmospheric temperature, pressure and moisture content taken at varying altitudes by means of balloons or rockets. Recent scientific advances now provide means for the accurate solution of this problem by mathematical comparison of angle of arrival measurements taken simultaneously in two different radiant energy frequencies. No existing system or combination of systems permits the taking of such measurements with sufficient accuracy to fully satisfy the rigid mathematical requirements for this comparison. The subject invention does satisfy these requirements.

Rapidly advancing military, scientific, and commercial space programs have increased enormously the need for dish resolution energy sensing systems. In addition to being extremely sensitive these must be capable of precisely tracking the courses of objects orbiting the earth of moving through space at great speeds.

Electronically steerable devices such as phased antenna arrays have been designed and tested, but they have limited signal discriminating capability, which adversely affects their reception of weak signals from very distant sources and their angle resolving accuracy, and are generally unsuitable.

Prior to the conception of the subject invention the only means for satisfying these needs appeared to be very large steerable antennas operating in the higher frequency ranges. But such antennas suffer from a multitude of deficiencies. Even moderate size antennas are difficult to drive at high tracking speeds. The massive electronic reflectors envisioned by our scientists and engineers simply cannot be moved with precision at the rates required.

Furthermore, such giant structures are vulnerable to two major sources of error. Their great masses render them susceptible to the effects of environmental conditions, such as wind, temperature changes, gravitation forces, earth movements, and inertial forces; all of which tend to deform the very large primary reflecting surface and frustrate the accurate measurement and interpretation of observation data. This frustration is compounded by the fact that the same conditions and forces also contribute to the physical displacement of the various components of the apparatus such as the primary reflector, the sub-reflector, and the monopulse horns with respect to each other.

Because of the great size of these structures and the extremely short wave lengths used, even miniscule deformations and displacements become critical; and to complicate the problem further, these deviations are generally not permanent but, rather, occur and vary over a wide range with periodicities measureable in microseconds. Heretofore the analysis of such manifold and rapid deformations and displacements could not be made with sufficient speed, accuracy or predictability to be of value in calibrating the apparatus as a whole or interpreting the results of observations.

Attempts have been made to avoid or minimize these problems by strengthening the structures, their foundations and driving mechanisms. Involved mathematical computations have been employed seeking to calculate in advance the disturbing effects. Efforts have been made to increase the speed of operation and sensitivity of the energy sensing means and readout systems. And many other methods have been used to obtain greater accuracy of measurement; but the results achieved have been totally inadequate.

Still another problem has arisen when attempts have been made to use angle measuring antenna systems involving combinations of energy sensing sub-systems. In most of these devices the sub-systems have been mounted on different axes. The geometry of such arrangements creates the need to correlate the measurements taken by each sub-system. As the size of these devices increases, however, such correlation is found to become increasingly difficult using existing techniques; and today it imposes a critical limitation on the accuracy and utility of this type of system. Even when the sub-systems have been mounted in a coaxial configuration the conditions and forces referred to earlier which tend to deform and displace their individual elements have made alignment to the accuracy required for precise correlation of output data impossible. As will be seen, the subject invention resolves these problems and eliminates the resulting limitations.

Still another problem lies in the delay inherent in many of these systems existing in the art in actually obtaining the angle measurement information in usable form from the energy sensing means itself, interpreting it, and applying the interpreted output for the intened purposes. Frequently the processing of these data cannot be accomplished until minutes, hours, or even days after the observation during which they were obtained. Obviously, this delay presents a very serious drawback in the fields of missile defense, space travel, satellite communication or any of the myriad applications in which immediate position determination is essential. One of the characteristics of the subject invention is that it permits the nearly instantaneous utilization of all observation data, thereby approaching the idealized concept of "real time" operation.

In order to fix the position of an object in space azimuth and elevation readings must normally be taken at two or three remote locations and the measurements then combined by some process akin to triangulation. All existing angle measurements devices are calibrated and make the measurements in terms of their predetermined location on the Earth's surface. Surprisingly, so little is known regarding the precise shape or size of the earth that heretofore it has been impossible to determine the location of these devices with the accuracy necessary to permit any more than a rough approximation of an object's position in space. The concept underlying the subject invention does not depend upon the predetermination of the location of the device itself with respect to terrestial geography; and therefore this problem is entirely eliminated.

B. *The method*

A number of avenues of approach have been taken in the continuing attempt to achieve more sensitive, accurate, and reliable measurement of the angle of arrival of radiant energy from objects in space. As indicated earlier, these have involved the use of both single and multiple frequency band devices, including optical telescopes, radars and radiotelescopes, and combinations of these systems; and have encompassed the application of complex mathematical analysis; computerization; and many other techniques.

All such efforts rely in common on the observation and interpretation of the received electromagnetic signals relative to the stationary energy receiving and sensing device. The effects of refraction of the incoming energy, deformation and displacement of the components comprising the structure of the device, nonrepeatable movements or "jitter" within the device, and all of the other sources of inaccuracy discussed earlier may be estimated, approximated, or ignored; but ultimately the output of the measuring system is treated in terms of a fixed Earth-related frame of reference.

The subject invention demonstrates a radical departure from this fundamental treatment. Rather than relating the measurement of the critical angles and the factors which effect such measurement to an Earth-oriented reference base, this invention contemplates the relation of all observed data to an extra-terrestrial frame of reference. More particularly, to an extremely accurately located source of radiant energy in space. The subject invention rejects the classical method of making observations from a fixed point on the Earth's surface in favor of a new and novel method by which the observing system and all measurements made with it are figuratively "hitched to a star."

As will become clear from reading the specification which follows, using this celestial reference as a base line frees the measuring system from the heretofore insurmountable limitations imposed on existing earth bound systems by the previously mentioned lack of precise knowledge of the Earth's geography and the geometry. In addition, the method of the subject invention permits the measurement and analysis of error producing deviations within the system which are not readily detectable in existing devices because they distort the Earth-oriented frame of reference itself.

In combination with the described method the subject invention encompasses new and novel means for detecting and accurately measuring the error producing distortions and displacements within the energy receiving system itself and utilizing these measurements to correct for the induced errors.

Further, this invention defines methods for the accurate location and tracking of objects traveling at high speed in space, and for communicating with such objects, under conditions which heretofore made such location, tracking and communication difficult if not impossible.

C.

With this background in mind, it is the object of the high precision system and method of the subject invention:

(1) To measure accurately the angle of arrival of electromagnetic energy from remote sources;

(2) To combine in a single apparatus radiant energy gathering and measuring sub-systems utilizing energies in different wave lengths;

(3) To employ such an apparatus to determine and compensate for the effects of atmospheric and extra-atmospheric refraction;

(4) To arrange the combined sub-systems in such a manner as to permit the accurate correlation of observations taken by each of them;

(5) To provide for instantaneous or near-real time availability of useable angle of arrival measurement data;

(6) To provide a system of the described class which uses a non-earth related frame of reference for measuring the angle of arrival of radiant energy;

(7) To provide a highly sensitive, extremely accurate system for surveillance, tracking and communication employing a celestially oriented frame of reference;

(8) To provide such a system for detecting, tracking and communicating with, objects travelling at great speeds in near or distant space;

(9) To provide for the instantaneous or near-real time detection and measurement of the deformation and displacement of the structural components comprising a system of the class described;

(10) To provide within such a system means for correcting angle of arrival measurement data for any errors induced by the deformation and displacement of the structural elements of the system;

(11) To provide an apparatus of the class described in which the effects of angle measurement error producing structural disturbances on one of the two combined energy sensing sub-systems tend to balance and substantially cancel the effects of those disturbances on the other of the sub-systems.

(12) To provide means for modifying existing radars and radiotelescopes so as to improve substantially their present accuracy, and to permit the construction of radars and radiotelescopes of any desired size having far greater accuracy than heretofore attainable.

Other and further objects will become obvious when the following specification is read in connection with the accompanying drawings. It must be understood, however, that neither the foregoing statement of objects nor the specification is intended to encompass or illustrate all of the forms or applications of the invention. The very nature of the invention and the limitations of space here prevent a full expression of the broad concepts embraced by it. Rather, the specification and drawings are intended merely as a description of several preferred embodiments of the invention as it is more fully defined in the claims which follow them.

In one preferred form the system contemplated by the subject invention combines two highly sensitive energy gathering sub-systems: a steerable radio telescope, having a large primary reflector and a smaller sub-reflector supported in the Cassegrain configuration, and an optical telescope, having a primary reflector and a moveable sub-reflector supported in the same Cassegrain configuration. The radio frequency sub-reflector is firmly attached to the lower end of the optical telescope and the two form a unit which is universally mounted for rotation about a center of rotation lying in the central axis of the radio telescope primary reflector. In this arrangement any rotational or translational movement of the radio frequency sub-reflector is experienced simultaneously by the entire optical telescope itself. Each of the sub-systems is provided with appropriate devices for sensing energy in its respective frequency range and with means for measuring independently of the other the azimuth and elevation angles of arrival of these energies.

Independently operable servo control systems and related drive trains are provided to steer and position the large radio-telescope and the unit containing the radio-frequency sub-reflector and optical telescope.

Within the optical telescope sub-system the optical sub-reflector is universally mounted for limited rotation about a center of rotation lying in the central axis of the optical primary reflector. Piezo-electric or magnetostrictive drivers and related linkages are provided to control the angular orientation of the optical sub-reflector with respect to the central axis of the optical primary reflector. Closed-loop circuitry utilizes an error signal, generated by the optical image scanner when the reflected image moves off-center, to activate the piezo-electric or magnetostrictive drivers. In response to this error signal the drivers rotate the optical sub-reflector to return the reflected image to the center of the image scanner.

By this means it is possible to maintain the reflected image in the "field of vision" of the optical telescope without moving the entire optical telescope and attached radio frequency sub-reflector.

Since the reflex time of the piezo-electric or magnetostrictive drivers is extremely short, this lock-on capability is effective even during tracking operations and while the entire system is being subjected to uncontrolled structural deformation, displacement, and internal vibration. In addition to the closed-loop circuitry for auto-control of the optical sub-reflector, provision is made for manual or programmed electronic control as well. By making the three control modes compatible it is possible to utilize them independently or simultaneously, depending on the nature of the particular use being made of the system.

A laser generator fixed on the optical telescope projects a narrow beam of coherent light through a train of mirrors onto a multi-faceted reflector, which is formed on the reverse side of the sub-reflector of the optical telescope. This reflector splits the beam into a plurality of very narrow rays which are directed at substantially equal divergent angles, preferably through a series of windows provided in the primary optical reflector and the secondary reflector of the radio telescope, and thence onto the primary reflector of the radio telescope. Sensor devices associated with these windows measure the angles at which these rays pass through the windows, and similar devices located in the primary reflector of the radio telescope measure the angles at which they strike the surface of that reflector.

A system of mirrors is positioned at each of the points on the primary reflector of the radio telescope where the laser rays strike its reflective surface to direct each ray along two or more separate paths. One of these paths returns a portion of each ray to the secondary reflector of the radio telescope where a sensor device measures its angle of arrival with respect to that reflector, and the other path or paths carry portions of each ray across the surface of the primary reflector of the radio telescope to one or more sensor devices which measure the angle of arrival of each ray with respect to the surface of the reflector at the respective sensor locations.

Theoretically, in the absence of structural distortion and deformation the angular paths followed by all of the laser rays should be identical and predictable. Any deviation noted in any of the angles formed by the actual path of any of the laser rays is ultimately attributable to structural aberrations in the system or its sub-systems, or to one or more of the previously discussed factors which effect laser propagation. Mathematical analysis of the angle measurement output of the laser sensor array provides a continuous and accurate method for the detection and measurement of the structural aberrations. Other means hereafter described are provided for the determination of the other disturbing factors.

Measuring devices associated with the system continuously detect and record any linear displacement or angular deviation of the radio telescope base with respect to the ground beneath it, and other pertinent parameters such as ambient and structural temperatures, wind velocity and direction, humidity, barometric pressure, precipitation and the like.

Conventional shaft-angle encoder means are provided on both the radio telescop eand the optical telescope to measure and continuously indicate the apparent azimuth and elevation "look-angles" of each of the sub-systems. These shaft measurement data and the angle measurement information derived from the laser sensor array are continuously fed into a hybrid data processing analog-digital computer, together with simultaneously acquired data concerning all of the relevant factors known to influence the structure of the composite system and its sub-systems and the propagation, detection, and measurement of radio and light energies. At the same time additional information including the signal output of the radio frequency receiver or radiometer and the optical image scanner, and selected ephemeris data are supplied to the computer for processing. Since the data gathering and input into the computer are going on continuously and simultaneously, the system is in fact operating in "real time."

The method contemplated by the subject invention does not require the use of the particular system described above for its application; however, it is especially suited for use with such a system. Accordingly, for the purpose of illustration only the method will be described as it would be employed in connection with that system.

Essentially the subject method involves four principal steps, namely: calibration of a steerable radio frequency antenna system for all possible azimuth and elevation combinations and all foreseeable combinations of variable factors which influence the accuracy of angle of arrival measurements; measurement of aberrations in the structure of the antenna system having an adverse effect on angle of arrival measurment accuracy; correction of angle measurement data for refraction caused by atmospheric conditions; and application of the data gathered to the problems of locating, tracking and communicating with objects in space.

In the calibration phase use is made of the existence of a number of celestial bodies which either emit energy falling in both the visible and the radio frequency ranges or emit energy in one of these ranges and, as a practical matter are in sufficiently close angular proximity to other celestial bodies emitting energy in the other range that they may be considered as a single source of both, and whose coordinates in space are known to a high degree of accuracy. These bodies include the planets Jupiter, Mars, Saturn and Venus, the stars Cygnus A and Cassiopia, and the nebula Orion. By simultaneously measuring the angle of arrival from one of these bodies of energy in both the visible and the radio frequency ranges, using optical and radio telescopes, the precise spacial relationships between the two telescopes can be determined; and measurements made with one of them can be related with relative ease to those made with the other.

The first step of the subject method, then, is to sight the optical telescope and the radio telescope of the subject system on a distant source of visible and radio energy, such as the planet Jupiter, and to compare the angle of arrival measurements of the two sub-systems.

The difference between the two angles is attributable to two major factors; refraction by the earth's atmosphere, and deformation of the reflective surfaces of the sub-systems and displacement of the component parts of the sub-systems with respect to each other.

The second step of the subject method is to determine the actual variation of the structural components from their theoretically calculated shapes and relationships. This may be accomplished by a variety of methods; but preferably the split laser beam angle measurement capability of the subject system is employed. By analyzing the deviations between related laser path angles as measured by the laser sensor array accurate determination of the actual as well as the relative structural deformity and displacement can be made. With such structural information it is then possible to ascertain the contribution made by these factors to the angle of arrival discrepency. The portion of this discrepancy remaining after eliminating the portions contributed by the structural aberrations is the result of refraction.

The third step is to determine the portion of the angle measurement discrepancy contributed by the refraction of the optical frequencies and that contributed by refraction of the radio frequencies.

By means of generally known and accepted mathematical computations using local temperature and atmospheric pressure at the observation site the optical index of refraction can be determined. The difference between the angle of arrival of the visible light, corrected for optical refraction and structure-related deviations, and that of the radio frequency energy likewise corrected for structure-related deivations, is a function of radio wave refraction. It is possible at this point to calculate this radio refraction factor with considerable accuracy.

During each of the preceding operations it is essential that continuous simultaneous measurements be made of the many variables, both within and without the antenna structure, which unfavorably influence the accuracy of sensitivity of the angle of arrival measuring system. By recording these measurements, together with the angle of arrival data obtained simultaneously with them, it is possible in the course of a number of observations to establish a catalogue which may be fed into data processing computer equipment to furnish the basis for error analysis and correction in subsequent operations.

The fourth step of the method taught by the subject invention is the utilization of the data gathered during the first three steps.

The data catalogue compiled for a particular observation site includes sufficient information gathered from celestial boresight measurements to permit the very accurate location of the site in terms of both celestial coordinates and terrestrial geometry. By comparing the location data for several remotely located sites, established by reference to a single celestial body, it is possible to determine with a high degree of precision the distances between the sites and their spacial positions relative to one another.

Although the locations and spacial relationships of the sites may be established for some purposes in terrestrial terms, that is earth-related measurements, for computer use they will be predicated on a reference system using the distant celestial energy source as its principal reference point.

Since all of the measurement data utilized by the computer at each site are likewise related to the same celestial reference and are compiled and compared in a real-time environment, they are removed from the influences of the unpredictable and unmeasureable factors which tend to degrade the accuracy of terrestrial related measurements.

Referring to the drawings:

FIGURE 1 is a perspective view illustrating a very large antenna system embodying the subject invention;

FIGURE 2 is a diagramatic side sectional view of the antenna of a system such as that illustrated in FIGURE 1 taken in a plane through the central geometric axes of the optical and radio frequency sub-systems with portions cut away to show the relationships between the principal structural elements of the sub-systems;

FIGURE 3 is a side sectional view taken through a portion of the radio-frequency sub-reflector of FIGURE 2 showing a typical group of elements comprising a portion of the laser measurement means;

FIGURE 5 is an end sectional view of the element shown in FIGURE 4, taken through 5—5; and FIGURE 6 is a block diagram illustrating the flow and application of data during the operation of a typical radiotelescope installation embodying the subject system.

As far as practicable like numbers are used in all of the figures to designate like components.

Figure 4:
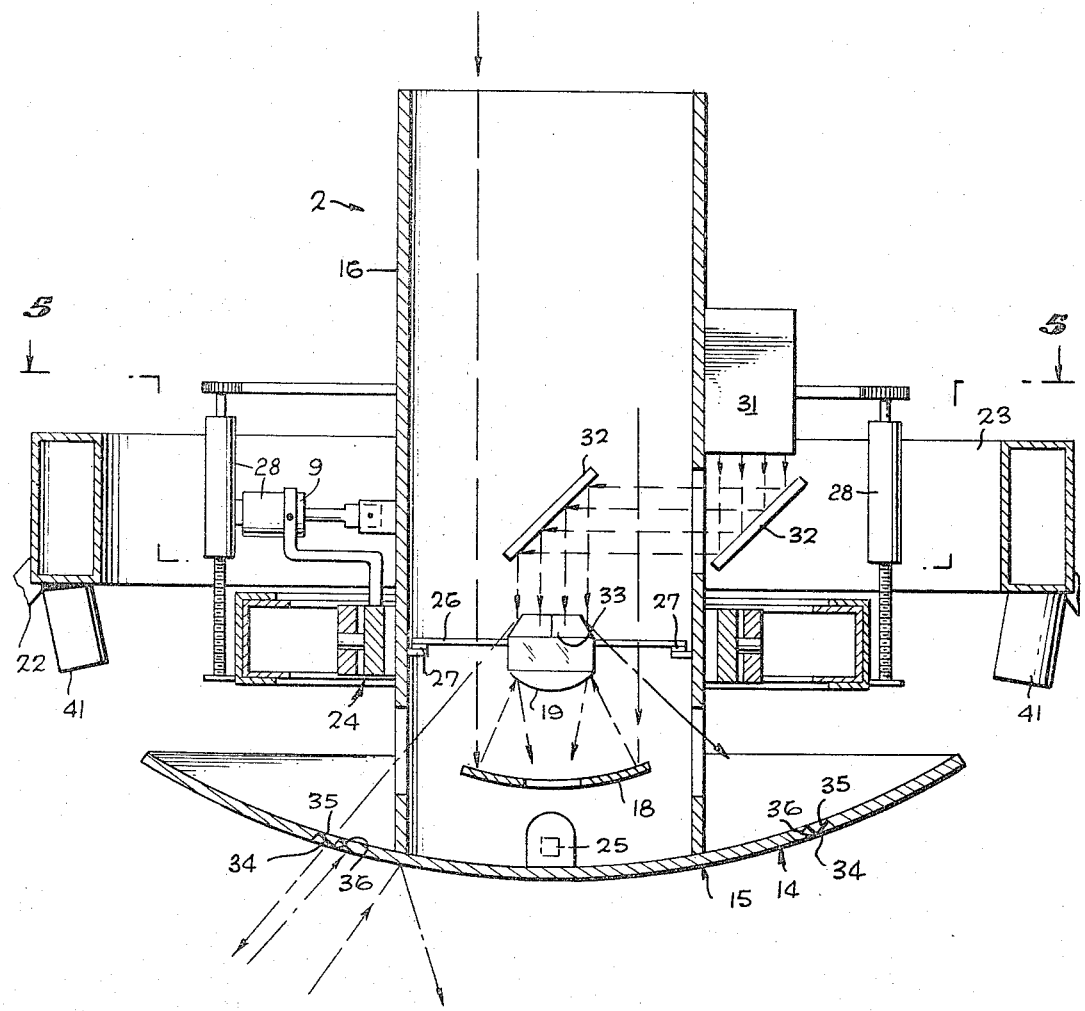
FIGURE 4 is a side sectional view of the unique unitary optical sub-system and radio-frequency sub-reflector element of the system depicted in FIGURE 2.

The system described in FIGURES 1 and 2 comprises a steerable radio telescope 1 of sufficient size to utilize the higher radio frequencies for probing deep space and a precise optical telescope 2. Since the subject invention is designed to compensate for internal structural movements, the particular form selected for the mounting of the radio-telescope primary reflector is relatively immaterial; however, the advantages of eliminating the long cantilever arms, massive counterweights, and other costly design characteristics required by systems which attempt to secure precision through rigidity are obvious.

In the mounting arrangement shown in FIGURE 1 and again in FIGURE 6, the entire system is supported on horizontal trunnions 3 and a plurality of trucks with bogies 4 disposed along a circular track. Customary driving and control means (not shown) are provided to rotate the entire system in elevation and azimuth; and conventional shaft encoders (not shown) or similar means are used to measure continuously and accurately the angular orientation of the system with respect to the central gravitational axis of the mounting. Shaft encoders 9 associated with the radiotelescope 1 are shown in FIGURE 6.

The radio telescope selected for descriptive purposes is of the Cassegrain configuration, having a parabolic primary reflector 11, a primary radiation element 13, such as a monopulse horn, and a hyperbolic sub-reflector 14, positioned within the prime focus of the primary reflector 11. The primary reflector is of skeletal construction and utilizes radial and ring trusses to support a reflective surface 12 of perforated or spaced sheets or open grillwork designed to reduce wind resistance. Similar construction of the sub-reflector 14 furnishes support for reflective surface 15.

Optical telescope 2 is contained in housing 16 which is supported by rotatable means on a plurality of legs 22 fixed at their lower ends to the supporting truss structure of primary reflector 11. The support means for the optical telescope may be of any one of a number of convenient forms. As shown in FIGURES 2, 4 and 5 one such form employs a supporting ring 23, firmly attached to the upper ends of quadropod legs 22, and a more or less conventional arrangement of gimbals and trunnions. Conventional driving and control means 28 are provided to provide for the rotation of the entire housing 16 universally about a single center of rotation and the lateral displacement of this center of rotation within ring 23. It should be pointed out that it is not essential to the subject invention that housing 16 be adapted for rotation; however, in the preferred embodiment such adaptation has a number of advantages which will be discussed in some detail later. An important feature in the form of the invention described here resides in the placement of the center of rotation of housing 16.

Although as mentioned earlier because of its great mass and the number and variety of forces acting upon it the primary radio-frequency reflector 11 is constantly being deformed, its reflective surface 12 has a mathematically predetermined "ideal" contour having a discrete electronic central axis. This "ideal" contour is selected to furnish the optimum electronic response to received radiation. As pointed out earlier, in the present state of the art it is impossible to determine with the accuracy necessary for today's uses the actual or "real" configuration of the reflective surface 12 or the "real" location of the electronic central axis in the operational radio telescope. It is desirable to establish and maintain the center of rotation of the primary optical reflector 18 as close as possible to the theoretically determined electronic central axis of the "ideal" contour of reflective surface 12. If necessary, the unique data output of the subject invention may be utilized in connection with the electromechanical devices, presently well known in the art, to adapt the quadropod legs 22, supporting ring 23, the gimbals and trunnions, and the optical system elements and their housing 16 toward achieving this end.

The radio-frequency sub-reflector 14 is rigidly attached to the lower end of housing 16 with the rearwardly projected central electronic axis of the sub-reflector 14 lying along the longitudinal central axis of housing 16. To comprehend the subject invention fully, it is necessary to appreciate the significance of this arrangement, in which the radio-frequency sub-reflector 14 and the entire optical sub-system 2 are integrated into a single unit.

Regardless of the particular configuration chosen for the radio-frequency sub-system 1, whether it be simple, with only the monopulse horn opposed to the primary reflector, or compound, as in the Cassegrain form illustrated here, at least one of its principal energy focusing elements will be positioned at a distance from the primary reflector. Generally the larger the radio telescope the greater the distance, and the greater the inherent inability to the structure employed to support this element to withstand the dislocating forces acting upon both the element and the structure itself. Thus, for example, it is a practical impossibility to construct quadruped legs 22 rigid enough to eliminate completely all lateral displacement of sub-reflector 14 and housing 16 with its contained optical sub-system 2.

For reasons which shall be clearly understood as this description proceeds, it is critical to the subject invention that optical sub-system 2 either undergo all displacements sustained by the sub-reflector or respond in a precisely determinable manner to all such displacements.

Pure lateral displacement, that is, lateral movement without rotation, within the limits reasonably anticipated in the operation of the subject system has little or no effect on the accuracy of the opical sub-system 2; however, even a relatively small lateral displacement of the radio-frequency sub-reflector 14 has a pronounced error-inducing effect on the radio telescope sub-system 1. On the other hand, rotational movements of the optical sub-system 2 and radio-frequency sub-reflector 14 have marked effects on the accuracy of both the optical and the radio-frequency sub-systems. Since any lateral displacement of the ends of quadropod legs 22 adjacent sub-reflector 14 and housing 16 will necessarily result in some rotation of suporting ring 23 and therefore housing 16 and the optical sub-system 2 along a transverse axis roughly perpendicular to the direction of such displacement, it is necessary to provide means associated with both the optical sub-system 2 and the radio-frequency sub-system 1 to compensate for or measure the error caused by this combined displacement and rotation. As already noted, direct measurement of this error is impossible; but as will be seen, means have been incorporated in the subject invention to compensate for it, with the result, among others, that it is possible to maintain the optical sub-system accurately on-target even though the radio telescope is temporarily inoperative, or, though operative, is out of electronic alignment because of lateral or rotational displacement of its sub-reflector 14.

It would be most desirable to locate the center of rotation of the entire optical sub-system 2, i.e. the center of rotation of primary optical reflector 18, at the center of curvature of the reflective surface of reflector 18 and simultaneously at the center of curvature of reflective surface 15 of the radio-frequency sub-reflector 14 thereby eliminating the effects of rotation on the two sub-systems; but this is a physical impossibility. Although not so illustrated in FIGURE 4, in practice sub-reflector 14 is mounted as close to optical reflector 18 as practicable so that the center of rotation of housing 16 will lie intermediate the center of reflective surface 15 and the center of the reflective surface of reflector 18. One effect of this location of the two centers of rotation is to place the signal error responses of the radio-frequency and optical sub-systems in apposition to one another, a condition highly useful in the operation of the subject system for distinguishing among the sources of such errors.

In addition, by having the centers of rotation of sub-reflector 14 and optical sub-system 2 substantially coincident and appropriately situated with respect to the axis of the hyperboloid sub-reflector 14, it is possible not only to utilize the optical telescope 2 independently of the radio telescope 1, but also to observe and track one optical source with the former while simultaneously observing and tracking an adjacent radio-energy source with the latter. This capability is extremely useful in a variety of situations met in the calibration and the operation of the subject invention.

Shaft encoders 9 or other suitable shaft angle measuring means are provided in connection with the structure supporting the unit comprising optical telescope 2 with its housing 16 and radio-frequency sub-reflector 14. These encoders 9 furnish continuous measurements of the apparent angular position of this unit with respect to the supporting ring 23 and thus, subject to the previously discussed rotational and lateral displacement of ring 23, relative to primary reflector 1 and, in turn, the central gravitational axis of its mounting.

It must be made clear at this point that although the expression "measure" has been used from time to time in describing the functions of the elements of the subject invention, it is neither required nor intended that measurements such as those of structural deformation and dislocation be made in absolute terms. To the contrary, it is fundamental to the subject invention that the error inducing structural aberrations of the subject system be related to one or more accurately located remote sources of radio and visible energy without actual measurement of the structure itself, and that the angle of arrival observations made with the two interconnected sub-systems be adjusted for the various denigrating factors by the correlation of observations made simultaneously with both sub-systems. For these reasons in its present context the term "measure" will be understood to means "quantize," and with the exception of the shaft encoders referred to earlier, the motion and dislocation sensing elements will be more accurately thought of as "quantizers" than "measuring" devices.

The optical telescope 2 is preferably in the Cassegrain configuration and comprises a primary reflector 18, a sub-reflector 19 positioned within the prime focus of reflector 18, and an image sensor 25, which may be of any desired type, such as an electronic scanner, an image disector, an orthicon or a vidicon. Optical sensor 25 may be mounted by conventional means on housing 16, on the upper side of sub-reflector 14, or on the other side of optical primary reflector 18. Both the radio-frequency primary radiation element 13 and the optical image sensor 25 may be adapted to facilitate the substitution or inclusion of number of different sensory means to perform a variety of surveillance, tracking, or communication operation.

Optical sub-reflector 19 is universally mounted on suitable conventional supporting means such as spider 26 for limited rotation about a point lying in the central optical axis of optical primary reflector 18. The precise angular orientation of sub-reflector 19 is continuously controlled by means of a plurality of piezo-electric, magnetostrictive, or other suitable activators 27 acting through appropriate linkages (not shown in detail). The optical sub-system 2 is adapted for a number of distinct modes of operation, but in all of them when the image received by optical sensor 25 moves off-center an electrical error signal is generated, and this error signal, fed to activators 27, excites them to re-orient sub-reflector 19 in position to re-center the displaced image.

Laser generator 31 fixed on housing 16, and mirror train 32, project a narrow beam of highly columnated light onto the identically bevelled reflective surface of precisely ground symmetrical multi-faceted reflector 33. The reflector 33 is preferably formed on the reverse side of optical sub-reflector 19; however, it may be ground separately and firmly attached to sub-reflector 19 with the same result. Regardless of the method of making this reflector, it should be of high quality quartz or similar durable material capable of being polished to very fine tolerances and having extremely low coefficients of deformation. Reflector 33 splits the light beam into a plurality of very narrow rays which are projected in equal divergent angles with respect to the central optical axis of optical sub-reflector 19 downwardly through a series of windows 34 provided in radio-frequency sub-reflector 14 and, if necessary, in primary optical reflector 18, and housing 16. The actual placement of these windows is dependent principally upon the particular configuration chosen for the various elements comprising the optical and the radio-frequency sub-systems.

In a highly refined modification of the subject invention, one or more additional laser generators 41 may be affixed to the edge or underside of supporting ring 23 or the upper ends of quadropod legs 22.

Windows 34 may be provided with half-silvered mirrors 35, such as that shown in FIGURE 3, which allow a portion of the laser ray to pass and reflect a portion of the same ray onto a light sensor 36, which may be in the internal form partially depicted in that figure. A device constructed in this form, i.e. with a series of concentric circular photosensitive layers 37 rearwardly decreasing in diameter is capable of not only sensing light impinging on it, but also of measuring the angular displacement of this light ray and the central axis of the sensor. By comparing the continuous simultaneous displacement readings of the sensors associated with all of the windows 34, it is possible to determine with great precision the orientation of the reflector 33 relative to radio-frequency sub-reflector 14, and vice versa.

The portion of the light rays passing through windows 34 and the light beams coming from laser generators 41, where they are used, are directed onto primary radio-frequency reflector 11. Mirror trains 42, preferably employing half-silvered mirrors similar to that shown in FIGURE 3, are positioned in or adjacent to the reflected surface 12 of primary reflector 11 at a plurality of stations to receive those light rays and beams. Each set of mirror trains 42 is firmly attached to the reflected surface 12 adjacent its particular station so as to move with the surface 12 at that station, and is adapted to project or pass a portion of each ray and beam through at least one of a plurality of light sensors 43, which may be similar in construction or sensor 36, positioned at other appropriate stations in or adjacent to the surface 12. In addition, mirror trains 42 return a portion of the light ray passing through each window 34 to a similar light sensor 44 positioned in or adjacent to the reflective surface 15 of radio-frequency sub-reflector 14 adjacent to that window.

By means of this arrangement of laser generators, mirrors, and light sensors, it is possible continuously and simultaneously to obtain angular displacement readings which bear a direct relationship to the relative displacement of, and distortion within, the elements forming the two basic sub-systems comprising the subject invention. It might be noted that although it should be possible to calibrate the combined sub-systems so as to permit these readings to be interpreted in terms of absolute displacement and distortion measurements, it is not necessary to do so in order to utilize the system contemplated by the invention. For all practical intents and purposes, the invention requires nothing more than some means, preferably those described here, but certainly not limited to them, for continuously and simultaneously correlating with great precision, the relative error-inducing movements of each of the principal components of the two sub-systems with respect to the other sub-system and the relative error-inducing movements within the principal components of each of the sub-systems with respect to their associated sub-system.

The shaft encoders and measuring devices referred to earlier for continuously and simultaneously detecting and recording the various pertinent parameters are not shown, but they are preferably contained in an on-board observation station 51 on the radio telescope mounting itself, and in a separate ground observation station 52, located adjacent the mounting. Typically such devices would include a very sensitive seismograph for measuring any earth tremors affecting the system, gravitometers for measuring any variation in the earth's gravitational field, and the standard meteorological instruments.

The hybrid electronic data processing and computer equipment previously mentioned, while necessarily complex and extensive, is comprised of components all of which are presently in existence. As illustrated in FIGURE 2, the recording and computing equipment needed for the "real time" operation of the system may be housed in a computer building 53 at the antenna site. It is not necessary, however, that all of the data storage and processing equipment be duplicated at each site. In order to avoid the high costs entailed in the duplication of equipment, and for other practical as well as theoretical reasons, it is advantageous to utilize the capabilities of a single centrally located computer to service smaller computers stationed at a number of sites by radio, cable, microwave transmission, or other convenient communication means.

As stated earlier, the system of the subject invention may take many forms other than the rather sophisticated embodiment illustrated in the foregoing description and the accompanying drawings. It is contemplated, for example, that existing radio-telescopes be adapted, by the addition of an optical telescope and laser projecting and sensing equipment, to employ the concept of the invention. Furthermore, for certain more limited uses smaller radars and radio-telescopes in which the present structural distortions are sufficiently insignificant to be disregarded may be refitted to employ the optical sub-system alone, without the addition of the distortion-sensing laser apparatus. For illustrative purposes, however, the method of the subject invention can best be described as it is applied to the antenna system shown in the drawings.

In the calibration mode of the method the optical-telescope and radio-telescope are used simultaneously in their auto-drive modes to track a single celestial source of visible and radio-frequency energy, such as Jupiter. As depicted in diagrammatic form in FIGURE 6, during the tracking operation, either continuous or frequent accurate readings of the apparent angular orientation of the optical telescope with respect to the precisely known ephemeris of Jupiter are taken. Simultaneously ambient air temperature, atmospheric pressure, and related data measurements 64 are made at the observation site. If the observations are made while Jupiter is at a relatively high elevation above the horizon, these latter measurements can be used to determine simultaneously with acceptable accuracy the index of optical refraction of the earth's atmosphere along the line of sight. With the index of optical refraction known, instantaneous correction of the apparent angle of arrival readings 57 may be made to show the continuous true angular orientation of the optical telescope with respect to the celestial frame of reference.

For each optical observation a simultaneous radio-telescope observation is made, giving the apparent angular orientation 58 of the radio-telescope with respect to Jupiter. In addition, concurrent readings are taken of all of the distortion sensing laser sensor outputs 61. The laws of repeatability applicable to large antenna structures dictate that within acceptable limits for any given ray path water vapor content (and therefore for any given index of radio-frequency refraction) the angular displacement of the apparent arrival angle of the radio-energy from Jupiter (or any other remote source) will be substantially identical for any repeated given set of laser sensor output parameters 61 and earth-referenced readings 62 of shaft encoders 9. Thus, by storing these parameters for data retrieval as they are taken for each radio-telescope observation made during periods of very low atmospheric water vapor content, a series of "memory models" of the radio-frequency sub-system can be compiled.

Since the ephemeris of Jupiter is precisely known at the instant of each observation, and the actual precise angular orientation of Jupiter from the observation site at each observation 65 is continuously being determined through the use of the optical telescope, it is possible to ascertain very accurately the angular orientation of each "memory model" of the radio-telescope with respect to the ephemerides of Jupiter. And correlatively, it is possible to determine the total electronic misalignment of the radio-telescope resulting from the combined effects of refraction of the received radio-energy and structural dislocations of the radio-telescope sub-system.

By comparing the air temperature and pressure and water vapor content measurements 64 and the refraction-corrected angle of arrival data for both telescopes 67 with the laser sensor "memory models" assciated with each set of readings, over a number of observations it is possible to ascertain the specific influence on the radio-telescope readings of refraction caused by atmospheric water vapor, regardless of the direction of observation and the elevation of the ray path above the horizon. As with all of the other measurement and correction information, these water vapor refraction data are stored for later retrieval and use in both the calibration and operational phases.

By extending the tracking of Jupiter and other available celestial dual energy sources from horizon to horizon on dry windless days, a substantial catalogue 66 of readings of the various required parameters is soon accumulated. This computerized catalogue 66 contains sufficient correlation information to permit the real time correction of radio-telescope angle of arrival measurements 67 by reference to simultaneous laser sensor outputs. The repeatability characteristics of the large antenna are such that it is not necessary to accumulate a vast number of "memory models" for comparison purposes. With a relatively limited number of such models in the computer catalogue 66 mathematical analysis permits the extrapolation of the laser sensor data well within useable tolerances.

Once the repeatable laser sensor output characteristics of the system have been determined for dry windless conditions, the same steps are carried out on windy days as well to establish a comparative set of laser sensor outputs for simultaneously measured wind conditions. By this repetitive process the subject method for the first time provides the means for calibrating any radio-telescope so that its readings may be corrected in real time operation for errors induced by ray path refraction and structural distortions, regardless of their cause.

Carrying the method a step further, with at least three remotely located observation sites embodying the basic elements of the subject invention simultaneous observations are made with both sub-systems at each site of a geodetic earth satellite, such as Anna IB and any convenient known celestial optical source, such as a data star, within the field of vision of the optical telescopes. Given the slant ranges to the satellite, as measured by the radio-telescopes, and the precise angular orientation of the satellite from each site, as determined by applying the previously established corrections for radio-telescope readings taken at each site, it is now possible to calculate within approximately one order of magnitude the base lines of the imaginary triangle formed by the sites. And in turn, with such information we now have the capability of utilizing these three sites for carrying on highly precise tracking operations based on a globally oriented frame of reference.

As indicated schematically by an arrow drawn from the upper side of laser generator 31, this generator may be adapted to project its highly columnated beam outwardly toward an object in space for communication as, for example, with a vehicle travelling through space. The chief problems heretofore involved in such communications have been the inability to hold a light transmitter on-target long enough and with sufficient accuracy to assure receipt by the distant vehicle of the transmitted information-bearing carrier, and the inability to hold the receiving telescope locked on the remote vehicle long enough to insure receipt of the entire information transmission.

To communicate with the subject invention, the message to be transmitted to the distant receiver is repeated continuously until acknowledged as having been received. Receipt of such acknowledgement as well as the return message is assured by the capability of the system to locate and track the vehicle in space with great accuracy and to retain it within its field of vision by means of the piezo-electric or magnetostrictive reflex mechanism built into the optical sub-system.

The same tracking and retention capabilities make the subject invention ideal for photographic missions previously considered impossible because of the length of time the object has to be focused on the photographic plate in order to obtain an acceptable exposure.

It should be apparent from the foregoing that the scope of the subject invention is far broader than the necessarily limited disclosure embodied in the specification. With this disclosure as illustrative background only, the following claims are intended to delineate the subject invention.

What is claimed is:

1. A high precision system for surveillance, tracking and communicating comprising in combination:
   (a) First electromagnetic sensor means for receiving and measuring the angle of arrival of radiant energy in a first frequency range from a remote source, said first sensor means including a primary reflector having a reflective surface and one or more secondary energy focusing elements;
(b) Second electromagnetic sensor means operating simultaneously with said first sensor means for receiving and measuring the angle of arrival of radiant energy in a second frequency range higher than said first frequency range from a remote source,
said second sensor means being effectively connected to one of said secondary energy focusing elements of said first sensor means so that all motions of said one secondary energy focusing element are predictably relatable to said second sensor means;
(c) Means for detecting and measuring the relative movements of said one secondary energy focusing element with respect to said reflective surface; and
(d) Means for continuously monitoring and correlating the angle of arrival measurements of said first and second sensor means and said motions and movements.

2. A high precision system for surveillance, tracking and communicating comprising in combination:
(a) First electromagnetic sensor means for receiving and measuring the angle of arrival of radiant energy in a first frequency range from a remote source,
said first sensor means including a primary reflector having a reflective surface and one or more secondary energy focusing elements;
(b) Second electromagnetic sensor means operating simultaneously with said first sensor means for receiving and measuring the angle of arrival of radiant energy in a second frequency range higher than said first frequency range from the same remote source,
said second sensor means being effectively connected to one of said secondary energy focusing elements of said first sensor means so that all motion of said one secondary energy focusing element are predicatably relatable to said second sensor means;
(c) Means for detecting and measuring the relative movements of said one secondary energy focusing element with respect to said reflective surface; and
(d) Means for continuously monitoring and correlating the angle of arrival measurements of said first and second sensor means and said motions and movements.

3. A high precision system for surveillance, tracking and communicating comprising in combination:
(a) First electromagnetic sensor means for receiving and measuring the angle of arrival of radiant energy in a first frequency range from a remote source,
said first sensor means including a primary reflector having a reflective surface and one or more secondary energy focusing elements;
(b) Second electromagnetic sensor means operating simultaneously with said first sensor means for receiving and measuring the angle of arrival of radiant energy in a second frequency range higher than said first frequency range from a remote source,
said second sensor means being mounted on one of said secondary energy focusing elements of said first sensor means;
(c) Means for detecting and measuring the relative movements of said one secondary energy focusing elements with respect to said reflective surface; and
(d) Means for continuously monitoring and correlating the angle of arrival measurements of said first and second sensor means and said relative movements.

4. A high precision system for surveillance, tracking and communicating comprising in combination:
(a) First electromagnetic sensor means for receiving and measuring the angle of arrival of radiant energy in a first frequency range from a remote source,
said first sensor means including a primary reflector having a reflective surface and one or more secondary energy focusing elements;
(b) Second electromagnetic sensor means operating simultaneously with said first sensor means for receiving and measuring the angle of arrival of radiant energy in a second frequency range higher than said first frequency from the same remote source,
said second sensor means being mounted on one of said secondary energy focusing elements of said first sensor means;
(c) Means for detecting and measuring the relative movements of said one secondary energy focusing element with respect to said reflective surface; and
(d) Means for continuously monitoring and correlating the angle of arrival measurements of said first and second sensor means and said relative movements.

5. A high precision system for surveillance, tracking and communicating comprising in combination:
(a) First electromagnetic sensor means for receiving and measuring the angle of arrival of radiant energy in the radio frequency range from a remote source,
said first sensor means including a primary reflector having a reflective surface and one or more secondary energy focusing elements;
(b) Second electromagnetic sensor means operating simultaneously with said first sensor means for receiving and measuring the angle of arrival of radiant energy in the light frequency range from a remote source,
said second sensor means being mounted on one of said secondary energy focusing elements of said first sensor means;
(c) Means for detecting and measuring the relative movements of said one secondary energy focusing element with respect to said reflective surface; and
(d) Means for continuously monitoring and correlating the angle of arrival measurements of said first and second sensor means and said relative movements.

6. A high precision system for surveillance, tracking and communicating comprising in combination:
(a) First electromagnetic sensor means for receiving and measuring the angle of arrival of radiant energy in the radio frequency range from a remote source,
said first sensor means including a primary reflector having a reflective surface and one or more secondary energy focusing elements;
(b) Second electromagnetic sensor means operating simultaneously with said first sensor means for receiving and measuring the angle of arrival of radiant energy in the light frequency range from the same remote source,
said second sensor means being mounted on one of said secondary energy focusing elements of said first sensor means;
(c) Means for detecting and measuring the relative movements of said one secondary energy focusing element with respect to said reflective surface; and
(d) Means for continuously monitoring and correlating the angle of arrival measurements of said first and second sensor means and said relative movements.

7. A high precision system for surveillance, tracking and communicating comprising in combination:
(a) First electromagnetic sensor means for receiving and measuring the angle of arrival of radiant energy in a first frequency range from a remote source,
said first sensor means including a primary reflector having a reflective surface and one or more secondary energy focusing elements;
(b) Second electromagnetic sensor means operating simultaneously with said first sensor means for receiving, and measuring the angle of arrival of, radiant energy in a second frequency range higher than said first frequency range from a remote source, said second sensor means being effectively connected to one of said secondary energy focusing elements of said first sensor means so that all motions of said one secondary energy focusing element are predicatably relatable to said second sensor means;

(c) Means for detecting and measuring deformities in said reflective surface and the relative movement of said one secondary energy focusing element with respect to said reflective surface;

(d) Means for continuously monitoring and correlating the angle of arrival measurements of said first and second sensor means and said deformities and relative movement.

8. A high precision system for surveillance, tracking and communicating comprising in combination:

(a) First electromagnetic sensor means for receiving and measuring the angle of arrival of radiant energy in the radio frequency range from a remote source, said first sensor means including a primary reflector having a reflective surface and one or more secondary energy focusing elements;

(b) Second electromagnetic sensor means operating simultaneously with said first sensor means for receiving, and measuring the angle of arrival of, radiant energy in the light frequency range from a remote source,
said second sensor means being effectively connected to one of said secondary energy focusing elements of said first sensor means so that all motions of said one secondary energy focusing element are predicatably relatable to said second sensor means;

(c) Means for detecting and measuring deformities in said reflective surface and the relative movement of said one secondary energy focusing element with respect to said reflective surface;

(d) Means for continuously monitoring and correlating the angle of arrival measurements of said first and second sensor means and said deformities and relative movement.

9. A high precision system for surveillance, tracking and communicating comprising in combination:

(a) First electromagnetic sensor means for receiving and measuring the angle of arrival of radiant energy in a first frequency range from a remote source, said first sensor means including a primary reflector having a reflective surface and one or more secondary energy focusing elements;

(b) Second electromagnetic sensor means operating simultaneously with said first sensor means for receiving, and measuring the angle of arrival of, radiant energy in the same remote source,
said second sensor means being effectively connected to one of said secondary energy focusing elements of said first sensor means so that all motions of said one secondary energy focusing element are predicatably relatable to said second sensor means;

(c) Means for detecting and measuring deformities in said reflective surface and the relative movement of said one secondary energy focusing element with respect to said reflective surface;

(d) Means for continuously monitoring and correlating the angle of arrival measurements of said first and second sensor means and said deformities and relative movement.

10. A high precision system for surveillance, tracking and communicating comprising in combination:

(a) A supporting base;

(b) A radio-frequency antenna system mounted on said base and including
a primary reflector having a central axis, a "real" contour, and a predetermined "ideal" contour and
a secondary energy focusing element directed against said primary reflector;

(c) An optical telescope rigidly connected to and supporting said secondary energy focusing element;

(d) A laser source mounted on said optical telescope;

(e) A plurality of optical sensors having optical centers of reference and being adapted to indicate the displacement of an optical image from said centers of reference associated with said radio-frequency primary reflector and said secondary energy focusing element;

(f) Means for splitting the light from said laser source into a plurality of rays and directing said rays to said optical sensors;

(g) Means adapted to monitor continuously the displacement of said laser rays from said optical centers of reference indicated by said optical sensors and to determine therefrom the deviation of said "real" contour from said "ideal" contour, the lateral displacement of said secondary energy focusing element with respect to said radio-frequency primary reflector, and the angular deflection of said optical telescope from the central axis of said radio-frequency primary reflector.

11. A high precision system for surveillance, tracking and communicating comprising in combination:

(a) A supporting base;

(b) A radio-frequency antenna system of the Cassegrain configuration mounted on said base and including
a primary reflector having a central axis, a "real" contour, and a predetermined "ideal" contour, and
a sub-reflector positioned in front and within the prime focus of said primary reflector;

(c) An optical telescope rigidly connected to and supporting said radio-frequency sub-reflector;

(d) A laser source mounted on said optical telescope;

(e) A plurality of optical sensors having optical centers of reference and adapted to indicate the displacement of an optical image from said centers of reference associated with said radio-frequency primary reflector and said sub-reflector;

(f) Means for directing a beam of light from said laser source to said optical sensors;

(g) Means adapted to monitor continuously the displacement of said laser beam from said centers of reference indicated by said optical sensors and to determine therefrom the deviation of said "real" contour from said "ideal" contour, the lateral displacement of said radio-frequency sub-reflector with respect to said radio-frequency primary reflector and the angular deflection of said optical telescope from the central axis of said radio-frequency primary reflector.

12. A high precision system for surveillance, tracking and communicating comprising in combination:

(a) A supporting base;

(b) A radio-frequency antenna system of the Cassegrain configuration mounted on said base and including
a primary reflector having a central axis, a "real" contour and a predetermined "ideal" contour, and
a sub-reflector positioned in front and within the prime focus of said primary reflector;

(c) An optical telescope rigidly connected to and supporting said radio-frequency sub-reflector;

(d) A plurality of optical sensors associated with said radio-frequency primary reflector,
said optical sensors having optical centers of reference and being adapted to indicate the displacement of an optical image from said centers of reference;

(e) A laser source integrally mounted on said optical telescope;
(f) A mirror train associated with said optical telescope and adapted to direct a highly collimated beam of coherent light from said laser source to the rear side of said optical sub-reflector;
(g) A multi-faceted mirror formed on the rear side of said optical sub-reflector and adapted to split the light from said laser source into a plurality of rays and to direct said rays to said optical sensors;
(h) Means adapted to monitor continuously the displacement of said laser rays from said optical centers of reference indicated by said optical sensors and to determine therefrom the deviation of said "real" contour from said "ideal" contour, the lateral displacement of said secondary energy focusing element with respect to radio-frequency primary reflector, and the angular deflection of said optical telescope from the central axis of said radio-frequency primary reflector.

13. A high precision system for surveillance, tracking and communicating comprising in combination:
(a) A base supporting mounting means adapted for universal rotation;
(b) A radio-frequency antenna system of the Cassegrain configuration mounted on said mounting means and including
    a parabolic primary reflector comprising an effective reflective surface and a rigid supporting structure therefor, said reflective surface having a central axis, a "real" contour, and a predetermined "ideal" contour,
    a hyperbolic sub-reflector positioned in front and within the prime focus of said primary reflector,
    a radiation element located at the focal point of, and effectively directed against, said sub-reflector, and
    radio-frequency sensor means adapted to indicate the displacement of a radio image from the said focal point
(c) Shaft encoders associated with said mounting means for indicating the azimuth and elevation angles of said radio-frequency antenna system;
(d) A plurality of rigid upstanding legs immoveably attached at their lower ends to said radio-frequency primary reflector and at their upper ends to a supporting ring;
(e) An optical telescope of the Cassegrain configuration rigidly connected to and supporting said radio-frequency subreflector and suspended from said supporting ring by gimbal means adapted for universal rotation about the focal point, and lateral displacement within the focal plane, of said radio-frequency primary reflector, said optical telescope including
    a parabolic primary mirror,
    a hyperbolic sub-reflector disposed in front and within the prime focus of said primary mirror and adapted for universal rotation,
    first driving means, including piezo electric activators, for controllably rotating said sub-reflector, and
    optical sensor means located at the focal point of said sub-reflector and adapted to indicate the deflection of an optical image from said focal point;
(f) Second driving means for controllably rotating and laterally displacing said optical telescope, and
(g) Shaft encoders associated with said gimbal means for indicating the azimuth and elevation angles and lateral displacement of said optical telescope;
(h) A laser source mounted on said optical telescope;
(i) A mirror train associated with said optical telescope and adapted to direct a highly collimated beam of coherent light from said laser source to the rear side of said optical sub-reflector;
(j) A plurality of windows in said primary mirror registering with a like number of windows in said radio-frequency sub-reflector and in the reflective surface of said radio-frequency primary reflector;
(k) A multi-faceted mirror formed on the rear side of said optical sub-reflector and adapted to split the light from said laser source into a plurality of rays and to direct said rays through said windows;
(l) A first set of optical sensors associated with the windows in said radio-frequency primary reflector, a second set of optical sensors associated at spaced intervals with the reflective surface of said primary reflector, and a third set of optical sensors associated with the windows in said radio-frequency sub-reflector,
    said optical sensors having optical centers of reference and being adapted to indicate the displacement of an optical image from said centers of reference;
(m) A plurality of mirror trains associated with the windows in said radio-frequency primary reflector adapted to direct a portion of the laser rays passing through said windows to the optical sensors associated therewith, a portion thereof to the optical sensors associated with said reflective surface, and a portion thereof to the optical sensors associated with the windows in said radio-frequency sub-reflector; and
(n) Computer means adapted to monitor continuously the displacement measurements indicated by said radio-frequency and optical sensors, including the displacement of said laser rays from said optical centers of reference, and the azimuth and elevation angle and lateral displacement measurements indicated by said shaft encoders, to determine the deviation of said "real" contour from said "ideal" contour, the angular and lateral displacement of said radio-frequency sub-reflector from the central axis of the reflective surface of said radio-frequency primary reflector, and the angular deflection of said optical telescope from said central axis, and to correct said azimuth and elevation angle measurements for errors induced by said deviation, deflection and displacements.

14. In a steerable antenna system including in combination a radio-frequency telescope and an optical telescope, the method of calibrating the radio-frequency telescope comprising:
(a) Simultaneously observing with both the radio-frequency telescope and the optical telescope a single celestial source of radio-frequency and visible energy having a known ephemerides and measuring with respect to each of said telescopes the apparent angle of arrival of said energy;
(b) Correcting the angle of arrival measurements made by said optical telescope for atmospheric optical refraction;
(c) Determining the effects on the angle of arrival measurements taken by said radio-frequency telescope of structural distortions within said telescope;
(d) Measuring the structural distortions existing within the said radio-frequency telescope at the time of each such observation;
(e) Correcting the apparent angle of arrival measurements taken by said radio-frequency telescope for the effects of said structural distortions therein;
(f) Ascertaining the effects of atmospheric refraction on the angle of arrival measurements of said radio-frequency telescope by comparing the apparent angles of arrival of said radio energy, corrected for the effects of structural distortion within the radio-frequency telescope, with the said angles of arrival of said visible energy, corrected for optical refraction; and, (g) Correcting said angle of arrival measurements of said radio-frequency telescope for the combined effects of said structural distortions and said atmospheric refraction.

References Cited

UNITED STATES PATENTS 3,261,016   7/1966   Burr _____ 343—100

RODNEY D. BENNETT, *Primary Examiner.*

CHESTER L. JUSTUS, *Examiner.*

B. L. RIBANDO, *Assistant Examiner.*